United States Patent [19]

Karasudani

[11] Patent Number: 5,369,590
[45] Date of Patent: Nov. 29, 1994

[54] INTER-VEHICLE DISTANCE DETECTING DEVICE

[75] Inventor: Keiko Karasudani, Himeji, Japan

[73] Assignee: Mitsubishi Denki Kabushiki Kaisha, Tokyo, Japan

[21] Appl. No.: 41,033

[22] Filed: Mar. 31, 1993

[30] Foreign Application Priority Data

Apr. 20, 1992 [JP] Japan ............................ 4-098446

[51] Int. Cl.$^5$ .......................... G01C 3/00; G06F 15/50
[52] U.S. Cl. .................................. 364/460; 364/461; 364/462.04; 180/167; 348/118
[58] Field of Search ............... 364/426.04, 431.07, 364/460, 461; 180/176, 177, 178, 179, 167–169; 123/350, 352; 340/435, 436; 348/113, 116, 118, 139

[56] References Cited

U.S. PATENT DOCUMENTS

| 5,023,712 | 6/1991 | Kajiwara | 348/139 |
| 5,159,557 | 10/1992 | Ogawa | 364/461 |
| 5,161,632 | 11/1992 | Asayama | 348/118 |
| 5,165,108 | 11/1992 | Asayama | 348/118 |
| 5,168,355 | 12/1992 | Asayama | 348/118 |
| 5,223,907 | 6/1993 | Asayama | 348/118 |
| 5,253,050 | 10/1993 | Karasudani | 348/118 |

FOREIGN PATENT DOCUMENTS

| 0465863 | 1/1992 | European Pat. Off. . |
| 0473945 | 3/1992 | European Pat. Off. . |
| 63-46363 | 9/1988 | Japan . |
| 135305 | 7/1989 | Japan . |

Primary Examiner—Gary Chin
Attorney, Agent, or Firm—Sughrue, Mion, Zinn, Macpeak and Seas

[57] ABSTRACT

An inter-vehicle distance detecting device displays the images of preceding vehicles, sets a tracking window surrounding one of the images and tracks it, calculates the distance from the driving vehicle to the preceding vehicle, and sets a plurality of shadow windows which are not displayed and which are different from the tracking window, at predetermined positions in the image taken by one of top and bottom image sensors. Distances from the driving vehicle to objects caught by the respective shadow windows are detected from the deviation between top and bottom corresponding image signals, and a symmetry determining means reads image signals in an arbitrary domain in the shadow windows and surroundings and determines horizontal symmetry. A cut-in vehicle or lane change of the one of the preceding vehicles which is image-tracked by predicting movements thereof in front of the driving vehicle is detected based on distance information from the driving vehicle to the objects in the shadow windows, an output of the symmetry determining means, and information provided by a calculation based on the preceding vehicle tracked by the tracking window.

2 Claims, 10 Drawing Sheets

INTER-VEHICLE DISTANCE DETECTING DEVICE

BACKGROUND OF THE INVENTION

The present invention relates to an optical distance detecting device employing image sensors, particularly to an inter-vehicle distance detecting device which continuously measures an inter-vehicle distance from a driving vehicle to a preceding vehicle.

Figure 15:
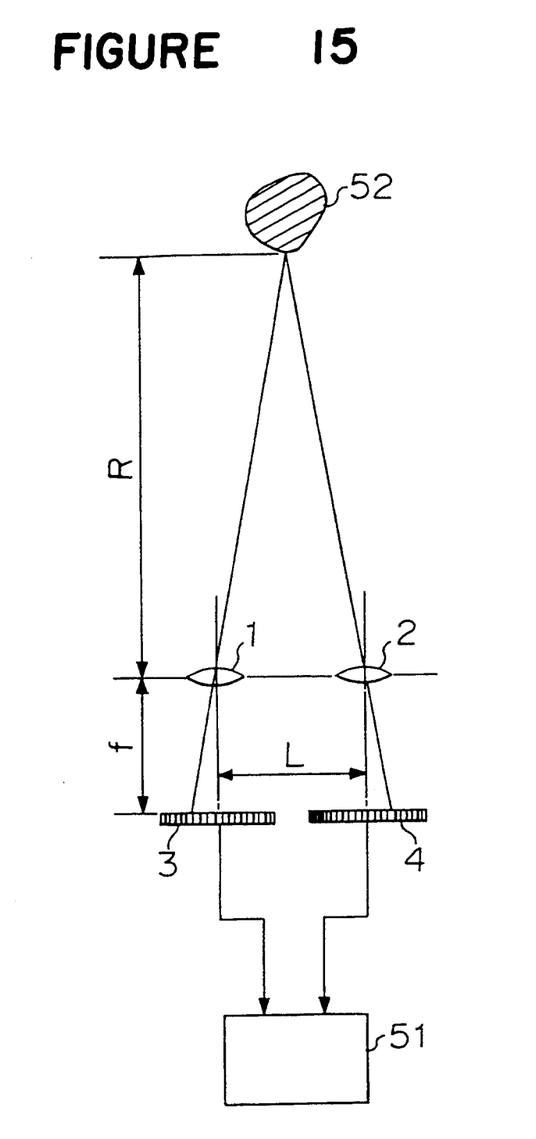
FIG. 15 is a construction diagram of a conventional device.

Conventionally, optical distance detecting devices employing image sensors are disclosed in Japanese Examined Patent Publication No. 38505/1988, Japanese Examined Patent Publication No. 46363/1988 and the like. All of these devices are provided with two left and right optical systems, as shown in FIG. 15. These left and right optical systems are constituted by lenses 1 and 2 disposed spaced apart from each other by a base length L.

Separate image sensors 3 and 4 are provided at positions spaced apart from the lenses 1 and 2 by a focal length f. In an image processing device 51, image signals of the image sensors 3 and 4 are electrically superposed by being successively shifted. A distance R from the lenses to an object 52 is provided by the following equation (1), from a shift quantity n wherein the above two images signals fit the most, under a principle of trigonometry.

$$R = f \times L / n \quad (1)$$

On the other hand, a method of image-tracking an image of a preceding vehicle taken by image sensors or the like, is disclosed in Japanese Examined Patent Publication No. 33352/1985. According to the publication, a target is image-tracked by setting a tracking gate (window) surrounding the target to be tracked on a display image plane, while an operator is observing the display image plane.

Since, in the conventional distance detecting device, the distance to the object is provided by comparing the images taken by the pair of left and right optical systems, in case wherein an inter-vehicle distance from a driving vehicle to a preceding vehicle is measured by mounting the device on the driving vehicle, when another vehicle is running on the lefthand side or on the righthand side of the preceding vehicle, a driver is not informed of which inter-vehicle distance of vehicle the device is measuring.

Furthermore, concerning a method of image-tracking an image of a preceding vehicle taken by image sensors or the like, the conventional image-tracking device is constructed such that the target is image-tracked by setting a gate (window) surrounding the object to be image-tracked on a display image plane, while an operator is observing the image display plane. The device is provided with a function wherein the device continues tracking a target once the target is determined, so far as the target is in the scope of vision even if it is moving. However, in an actual road, there are cases wherein another vehicle cuts in between the driving vehicle and the preceding vehicle, or the preceding vehicle image-tracked currently changes the driving lane to another lane. When this situation takes place, the vehicle which has been regarded as the former preceding vehicle is not the currently tracking "preceding vehicle", and the cut-in vehicle or a vehicle in front of the former preceding vehicle becomes a new "preceding vehicle". In the conventional tracking device, once the image of the preceding vehicle is set as the target on the display image plane, so far as the image of the preceding vehicle is present on the display image plane, it is possible to image-track the image of the preceding vehicle. However, when a new preceding vehicle shows up, it is not possible to detect the showing-up and reset the new preceding vehicle as the target on the display image plane. Accordingly, the driver must drive the vehicle while always observing the display image plane in details, and manually reset the tracking window every time when the cutting-in or the lane change takes place, which is a very dangerous driving.

SUMMARY OF THE INVENTION

It is an object of the present invention to solve the above problem and to provide an inter-vehicle distance detecting device, which has the construction combined with the conventional optical inter-vehicle distance detecting device and an image-tracking device of a preceding vehicle, capable of measuring a distance from the driving vehicle to the target continuously so far as the target is in the scope of vision, even if it is moving, once a target is determined, and recognizing which is the target of the preceding car of which inter-vehicle distance is being measured, even when a plurality of preceding vehicles are running, and detecting a situation wherein the target of the preceding car should be changed, for instance, the cutting-in of another vehicle to the driving lane, or the lane change of the preceding vehicle which has been the target of tracking. Furthermore, it is an object of the present invention to provide an inter-vehicle distance detecting device capable of automatically setting a tracking window surrounding a preceding car which is a new target of tracking, without observing the display image plane.

According to a first aspect of the present invention, there is provided an inter-vehicle distance detecting device wherein top and bottom image signals focused on top and bottom image sensors substantially by a pair of top and bottom optical systems, are compared and distances from a driving vehicle to preceding vehicles are measured by detecting deviation between the top and bottom images under a principle of trigonometry comprising:

a display means for displaying the images of the preceding vehicles taken by either one of the top and bottom image sensors;

an image-tracking means for setting a tracking window surrounding one of the images of the preceding vehicles and image-tracking said one of the images of the preceding vehicles by the tracking window;

a first distance detecting means for calculating the distance from the driving vehicle to the one of the preceding vehicles by detecting the deviation between the corresponding top and bottom images wherein an image signal of the one of the preceding vehicles is a reference signal;

a shadow window setting means for setting a plurality of shadow windows which are not displayed on a display image plane and which are totally different from the tracking window, at predetermined positions in the image taken by one of the top and bottom image sensors;

a second distance detecting means for detecting distances from the driving vehicle to objects caught by the respective shadow windows by detecting the deviation between top and bottom corresponding image signals wherein image signals in the shadow windows are reference signals;

a symmetry determining means for reading image signals in an arbitrary domain in the shadow windows and surroundings thereof and determining horizontal symmetry in the arbitrary domain;

a detecting means for detecting a cut-in vehicle or lane change of the one of the preceding vehicles which is image-tracked by predicting movements of the preceding vehicles in front of the driving vehicle based on a distance information on the distances from the driving vehicle to the objects in the shadow windows caught by the second distance detecting means, an output of the symmetry determining means and an information provided by a calculation result of the image-tracking means on the one of the preceding vehicles which is image-tracked by the tracking window.

According to another aspect of the present invention, there is provided the inter-vehicle distance detecting means according to the first aspect, further comprising:

a means for determining a position of a second one of the preceding vehicles which is a new object for image-tracking based on a symmetry information on the horizontal symmetry provided by the symmetry determining means and the distance information provided by the second distance detecting means on the shadow windows in the neighborhood of candidate points of presence of the preceding vehicles, when the lane change of the one of the preceding vehicles which is being image-tracked or the cut-in vehicle is detected by predicting the movements of the preceding vehicles in front of the driving vehicle; and a means for automatically setting a second tracking window in place of the tracking window having a size in correspondence with a distance from the driving vehicle to the second one of the preceding vehicles such that the second tracking window surrounds an image of the second one of the preceding vehicles.

In the present invention, the first distance detecting means calculates the inter-vehicle distance from the driving vehicle to the preceding vehicle by detecting the deviation between the top and bottom corresponding image signals wherein the image signal in the tracking window is the reference signal, thereby continuously detecting the inter-vehicle distance from the driving vehicle to the preceding vehicle. Furthermore, the second distance detecting means employing the plurality of shadow windows which are not displayed on the image plane, compares the top and bottom corresponding images taken by the two image sensors wherein the image signals in these windows are the reference signals, electrically detects the deviation between the both images, measures the distances from the driving vehicle to the objects caught by the respective shadow windows, and monitors the presence or absence of the preceding vehicle or other obstacles, and their approximate positions. Furthermore, the symmetry determining means finds out the place of the best horizontal symmetry on the display image plane, and determines the place as a candidate of the position of the presence of the preceding vehicle. Based on these informations, it is possible to monitor the movement of the preceding vehicle in front of the driving vehicle, and detect the showing-up of a cut-in vehicle or a new preceding vehicle by the lane change of the preceding vehicle which has been the target of tracking.

Furthermore, when the showing-up of the new preceding vehicle is detected, the set position of the tracking window surrounding the new preceding vehicle is specified, based on the informations provided by the second distance detecting means and the calculation result of the symmetry determining means. The tracking window having a predetermined size in accordance with the distance from the driving vehicle to the new preceding vehicle is automatically set at the position, and the image-tracking, the distance detection or the like is continuously performed as explained as above.

DETAILED DESCRIPTION OF THE PREFERRED EMBODIMENT

Figure 1:
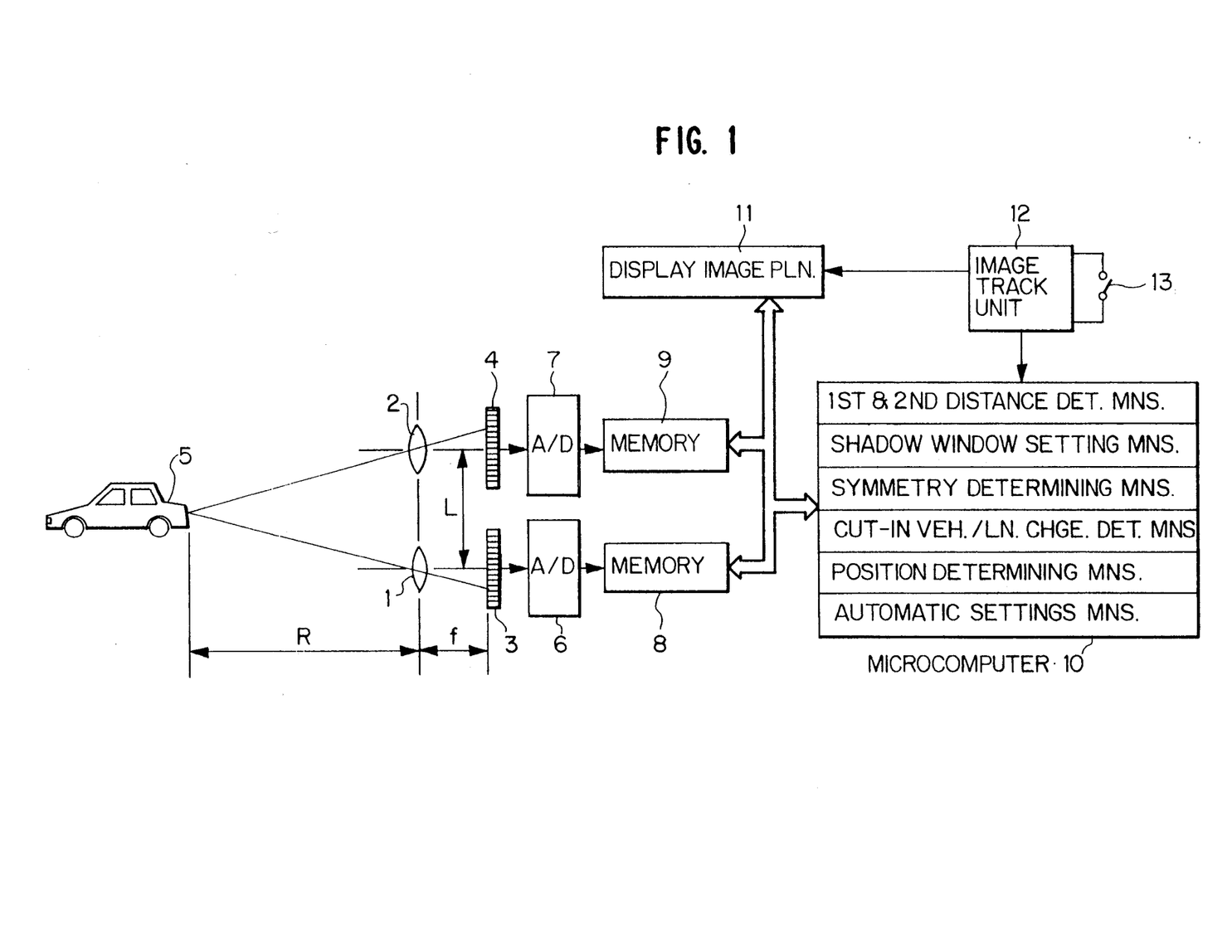
FIG. 1 is a construction diagram showing an embodiment of an inter-vehicle distance detecting device according to the present invention.
Figure 5:
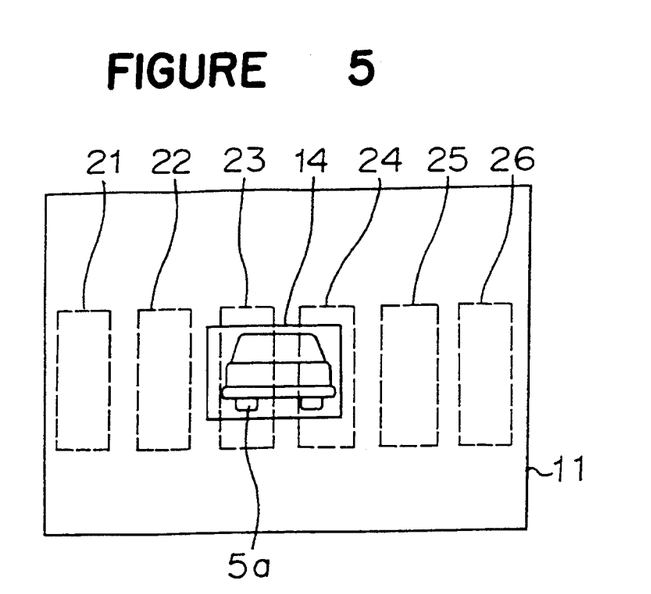
FIG. 5 is a diagram showing a relationship between a tracking window which is image-tracking an image of a preceding vehicle, and a plurality of shadow windows which are not displayed on a display image plane according to the present invention.

An embodiment of the present invention will be explained referring to the drawings, as follows. In FIG. 1, reference numerals 1 and 2 designate lenses constituting top and bottom optical systems, 3 and 4, two-dimensional image sensors provided respectively corresponding to the lenses 1 and 2, and 5, a preceding vehicle to be tracked. Numerals 6 and 7 designate analogue-to-digital converters, 8 and 9, memories, 10, a microcomputer, and 11, a display image plane for displaying an image taken by the bottom image sensor 3, which is controlled by the microcomputer 10. A numeral 12 designates an image tracking unit for forming a tracking window 14 for image-tracking an image 5a of a preceding vehicle on the display image plane 11 and shadow windows 21 through 26 which are not displayed on the display image plane 11, as shown in FIG. 5, and performing image-tracking of the image 5a of the preceding vehicle surrounded by the tracking window 14, and 13, a tracking instruction switch which is operated by a driver.

Figure 2:
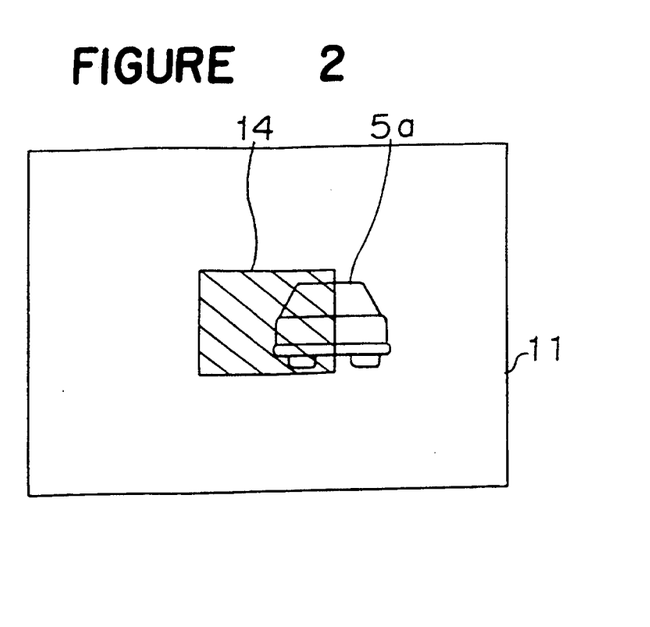
FIG. 2 shows a situation wherein an image of a preceding vehicle enters a display image plane of the present invention.
Figure 3:
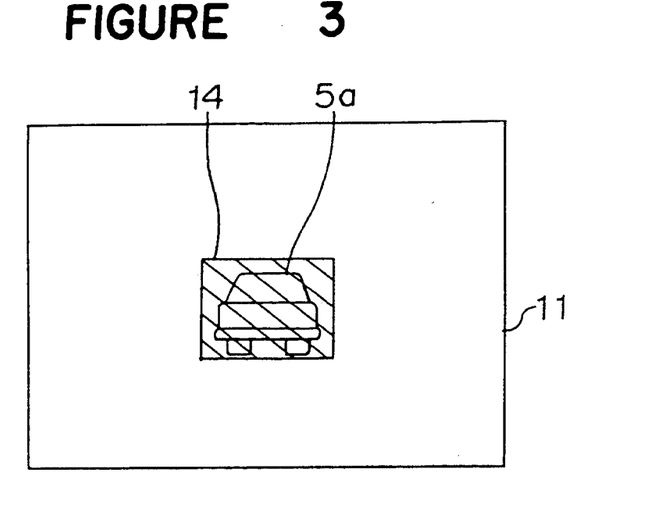
FIG. 3 shows a situation wherein a driver controls a tracking window so as to surround around an image of a preceding vehicle by driving while observing a display image plane according to the present invention.
Figure 6:
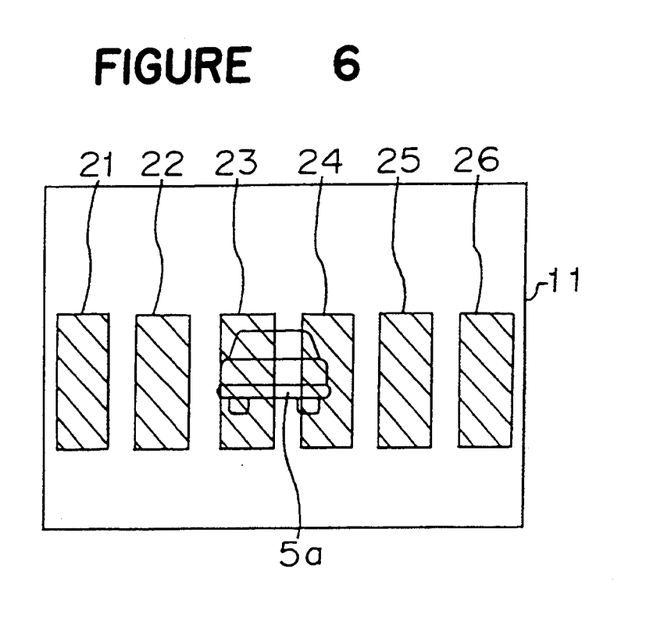
FIG. 6 is a diagram showing a positional relationship between an image of a preceding vehicle and a plurality of shadow windows according to the present invention.

In the above construction, for instance, when the image 5a of the preceding vehicle 5 to be tracked enters the image of the bottom image sensor 3, and is displayed on the display image plane 11 wherein the tracking window 14 is set, as shown in FIG. 2, the driver changes the relative position between the preceding vehicle 5 and the driving vehicle by driving the driving vehicle, and moves to a position wherein the image 5a of the preceding vehicle enters the tracking window 14. When the image 5a of the preceding vehicle enters the tracking window 14 as shown in FIG. 3, and the driver operates the tracking instruction switch 13, thereafter, even if the preceding vehicle 5 moves in any directions in the display image plane 11, the tracking window 14 moves followingly, and the image-tracking operation of the image 5a of the preceding vehicle by the tracking window 14 is automatically performed. Furthermore, other than the image-tracking, the plurality of shadow windows 21 through 26 which are not displayed on the display image plane 11 are automatically set by the tracking instruction switch 13, as shown in FIGS. 5 and 6, and the distance detection from the driving vehicle to the object surrounded by the shadow windows 21 through 26, is automatically performed. The image-tracking operation by the image-tracking unit 11 is similar to the conventional devices disclosed in Japanese Examined Patent Publication No. 33352/1985, or Japanese Examined Patent Publication No. 35305/1989, and a detailed explanation will be omitted.

Figure 4:
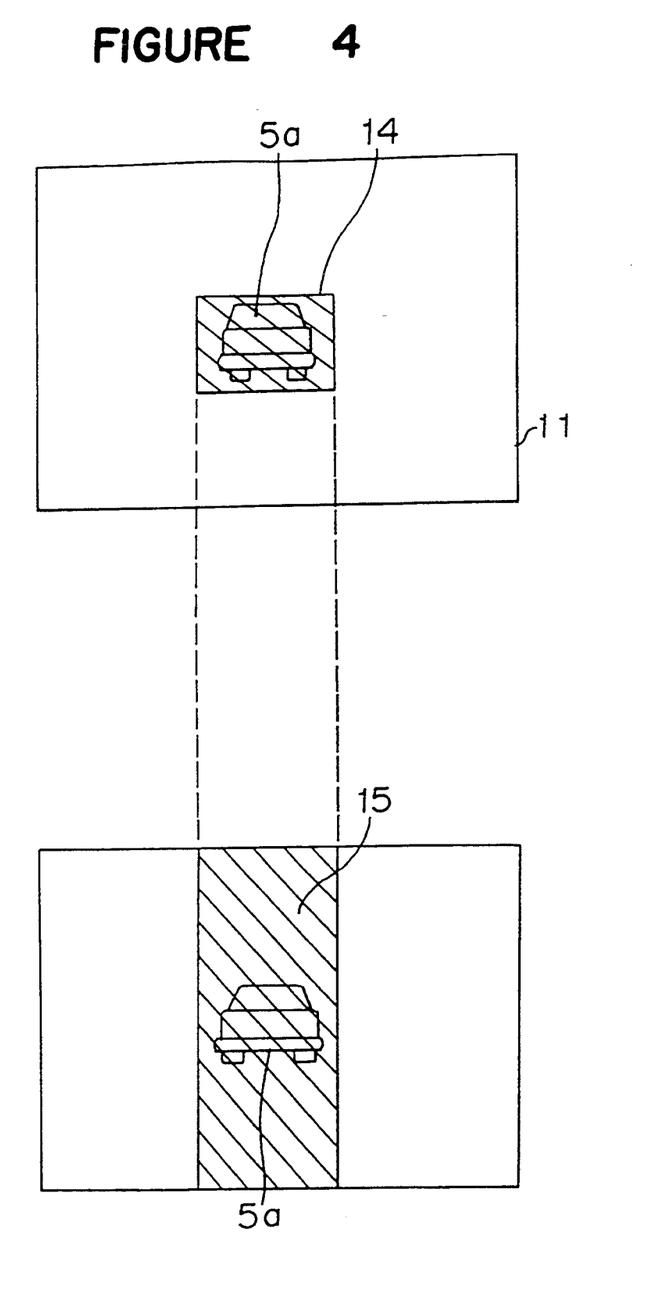
FIG. 4 is a diagram showing a domain of an image which is compared to an image in a tracking window according to the present invention.

Next, explanation will be given to the operation of the inter-vehicle distance detection between the driving vehicle to the preceding vehicle 5 which is the target of the image-tracking on the display image plane 11. First, the microcomputer 10 reads pixel signals in the tracking window 14 tracking the image 5a of the preceding vehicle, and determines them as reference image signals for calculating the inter-vehicle distance. The microcomputer 10 selects domains corresponding to the tracking window 14 in the memory 9 wherein the image signals of the top image sensor 4 are memorized, and calculates a summation of absolute values of a reference signals at every top and bottom pixel by successively shifting the image signal of the memory 9 with respect to the reference image signals, pixel by pixel. That is to say, a position of an image which fits the most with the image in the tracking window 14 is provided by successively shifting the image, pixel by pixel. At this occasion, the domain in the memory 9 which relates to the calculation, is a domain 15 corresponding to the tracking window 14, as shown in FIG. 4. As stated above, a shift quantity of pixel which minimizes the summation of the absolute value of the difference signal by comparing the top and bottom pixels, is determined to be n pixel, the pitch of pixel, P, the base length of the optical system, L, and the focal length of the lenses 1 and 2, f. Then, the distance R from the lenses to the preceding vehicle is provided by the following equation (2).

$$R = f \times L / n \times P \qquad (2)$$

In this way, even when the preceding vehicle moves in the left, right, front and rear directions with respect to the preceding vehicle 5 to which the tracking window 14 is set, the preceding vehicle 5 is image-tracked by the tracking window 14, and the inter-vehicle distance from the driving vehicle to the preceding vehicle 5 can continuously be provided.

Figure 7:
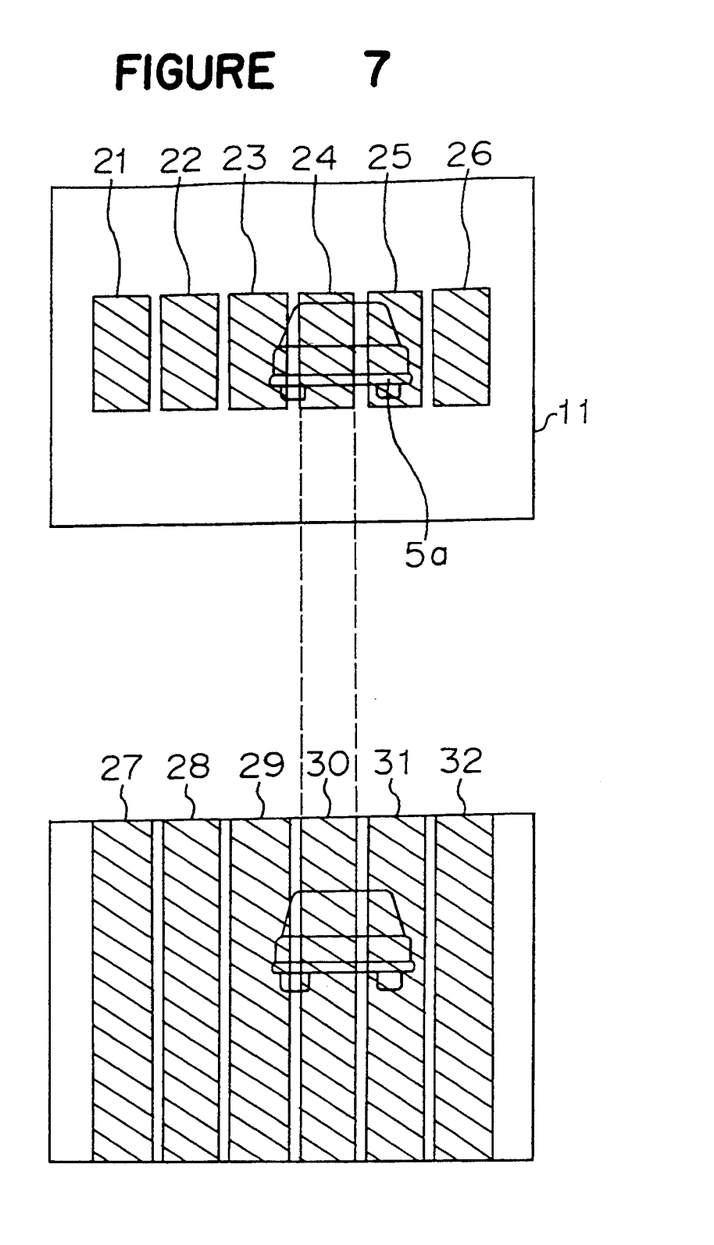
FIG. 7 is a diagram showing image domains which are compared with reference images in the shadow windows according to the present invention.

The image 5a of the preceding vehicle is image-tracked by the tracking window 14 by the above method, and the distances from the driving vehicle to the objects designated by the shadow windows 21 through 26 which are set on the image taken by the bottom image sensor 3 as shown in FIGS. 5 and 6, are measured. The method of the distance measurement with respect to each shadow window is the same with that in detecting the inter-vehicle distance between the driving vehicle to the preceding vehicle, stated as above. For instance, FIG. 7 shows a positional relationship between the image 5a of the preceding vehicle and a plurality of shadow windows 21 through 26. An explanation will be given of the window 24 substantially catching the image 5a of the preceding vehicle. First, the microcomputer 10 reads the image signal of the shadow window 24 from the memory 8, which is determined to be a reference image signal. Furthermore, the microcomputer 10 selects a domain corresponding to the shadow window 24 in the memory 9 wherein the image signal of the top image sensor 4 is memorized, and provides a position of the image which fits the most with the image in the window 24 in this domain, by successively shifting it, pixel by pixel. The domain in the memory 9 corresponding to the shadow window 24 is a domain 30 in FIG. 7. The distance from the driving vehicle to the preceding vehicle in the shadow window 24 can be provided based on the deviation between the top and the bottom images obtained as above, as in the equation (2).

Similarly, the images of the objects caught by the plurality of shadow windows 21, 22, 23, 25 and 26 which are not displayed on the display image plane 11, are compared with the respective reference images, in calculation domains 27, 28, 29, 31 and 32 respectively corresponding to these windows as shown in FIG. 7, and the distances from the driving vehicle to the objects designated by the respective windows, can be measured.

The microcomputer 10 compares measured values of the image with respect to the shadow windows 21 through 26 which are measured as above, selects the shadow windows showing approximately the same measured value, having a comparatively short-distance in the contiguous windows, and predicts that there is the preceding vehicle in the neighborhood, unless there are rapid changes in these measured values. For instance, in FIG. 7, the image 5a of the preceding vehicle which is image-tracked, is displayed on the display image plane 11. At this occasion, the distances from the driving vehicle to the image 5a of the preceding vehicle which are caught by the shadow windows 24 and 25, are stably detected. Therefore, it is predicted that there is the preceding vehicle 5 in the neighborhood of the shadow windows 24 and 25.

Figure 8:
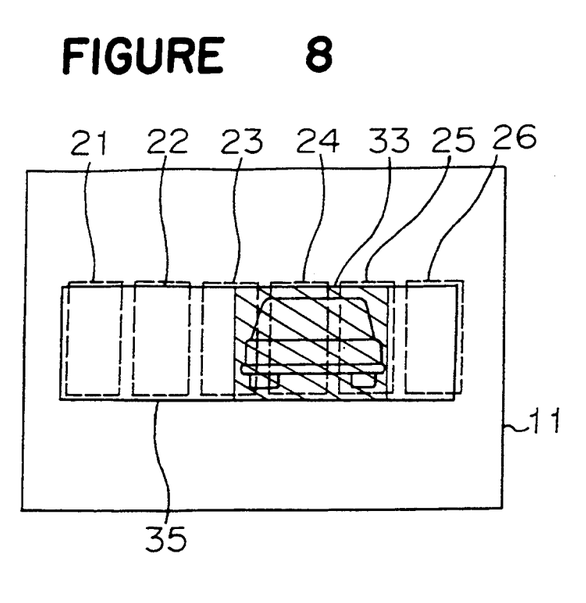
FIG. 8 is a diagram showing a gate for determining symmetry and its scanning domain according to the present invention.

By the way, when the target for measuring distance is an automobile, the image thereof observed from behind is often generally horizontally symmetrical. Therefore, the horizontal symmetry in the domain wherein the plurality of shadow windows 21 through 26 are set, is determined by employing the characteristic, the position of the image of the preceding vehicle in front of the driving vehicle is specified by the distance information and the position information of the tracking window, and the movement of the preceding vehicle is detected. First, explanation will be given to the determination of the symmetry. As shown in FIG. 8, a gate 33 having a size in correspondence with the distance, is prepared by the distance information provided by the shadow windows 23, 24 and 25 catching the preceding vehicle, the following calculation is performed with respect to the image signal in the gate by shifting the gate 33 in a domain 35 wherein the plurality of shadow windows 21 through 26 are set in a memory, and the symmetry is evaluated. In the following equation (3), S(i, j) designates an image signal in the symmetry determining domain 35, m, a width of the gate 33, n, a height of the gate 33, and w, a 20 width of the symmetry determining domain 35.

$$Ak = \sum_{j=0}^{n-1} \sum_{i=0}^{m/2-1} \{|S(k+1,j) - S(k+m-1-i,j)|\}, \quad (3)$$

where k=1, 2, ..., w-m.

The position which minimizes the value of Ak in the above equation shows the best symmetry. However, actually, there are several things having the good symmetry other than the preceding vehicle on the road. Therefore, the calculation result of the equation (3) may be provided with several minimum values, which are candidates of the position of presence of the preceding vehicle.

As stated above, the place wherein the position of shadow window predicted by the distance information of the contiguous shadow windows agrees with the candidate point of the presence of the preceding vehicle by the symmetry value, can be specified as the position of the presence of the preceding vehicle in front of the driving vehicle on the display image plane 11.

Figure 10:
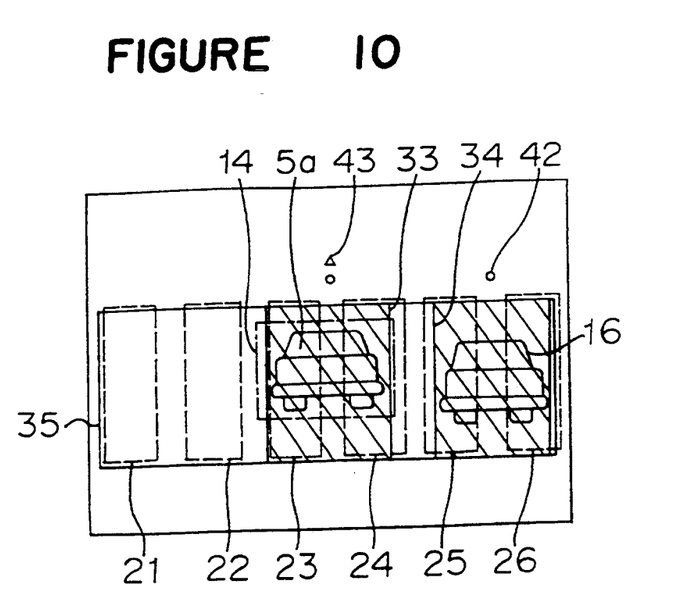
FIG. 10 is a diagram showing a gate for determining symmetry of a cut-in vehicle and a preceding vehicle, when the cut-in vehicle shows up and its scanning domain according to the present invention.
Figure 11:
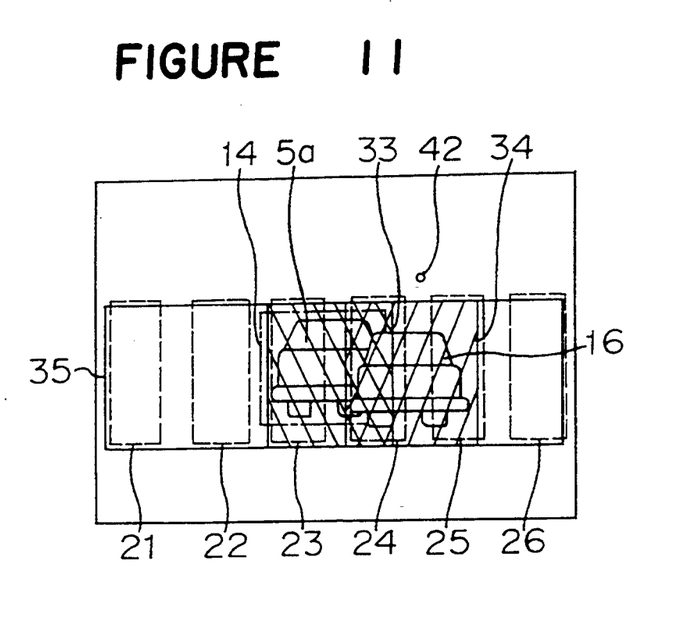
FIG. 11 is a diagram showing a gate for determining symmetries of a cut-in vehicle and a preceding vehicle when the cut-in vehicle shows up according to the present invention.

Next, explanation will be given of detecting movements of the preceding vehicles in front of the driving vehicle, by the distance information of the shadow windows, the symmetry information provided by the symmetry evaluation means and the position information provided by the tracking window. In this embodiment, explanation will be given to the detecting the movements of the preceding vehicles, particularly to detecting cutting-in of another vehicle to the driving lane. As shown in FIG. 10, another preceding vehicle 16 is running on the right lane of the preceding vehicle 5 which is being image-tracked. A reference numeral 43 designates a point which is detected as the position of presence of the image 5a of the preceding vehicle which is being image-tracked by the method explained as above, 42, a position which is detected as the position of presence of the preceding vehicle 16 which is running on the righthand side of the preceding vehicle 5, and 33 and 34, gates for determining the symmetries of the respective preceding vehicles. When the preceding vehicle 16 cuts in between the preceding vehicle 5 in front of the driving vehicle on the driving lane, and the driving vehicle, a set of contiguous windows detecting the distance from the driving vehicle to the preceding vehicle 16, moves to the left by one window from 25 and 26 to 24 and 25 as shown in FIG. 11, the candidate point of the presence of the preceding vehicle provided by the symmetry determination, moves to the left as shown in FIG. 11, and approaches to the tracking window 14 surrounding the preceding vehicle 5. Accordingly, by detecting the approach of the positions of the contiguous shadow windows selected from the shadow windows 21 through 26 which are measuring the same distance, to the position of the tracking window, along with the candidate point of presence of the image of the preceding vehicle provided by the symmetry determination, the cutting-in of the right preceding vehicle 16 to the driving lane can be detected.

Figure 9:
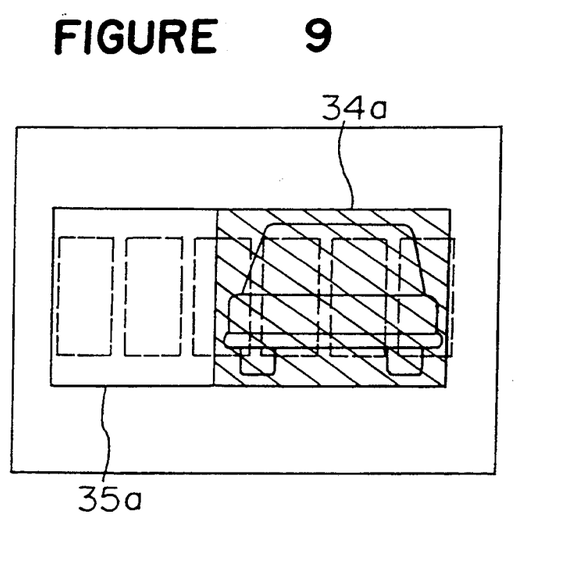
FIG. 9 is a diagram showing a gate for determining symmetry and its scanning domain according to the present invention.
Figure 12:
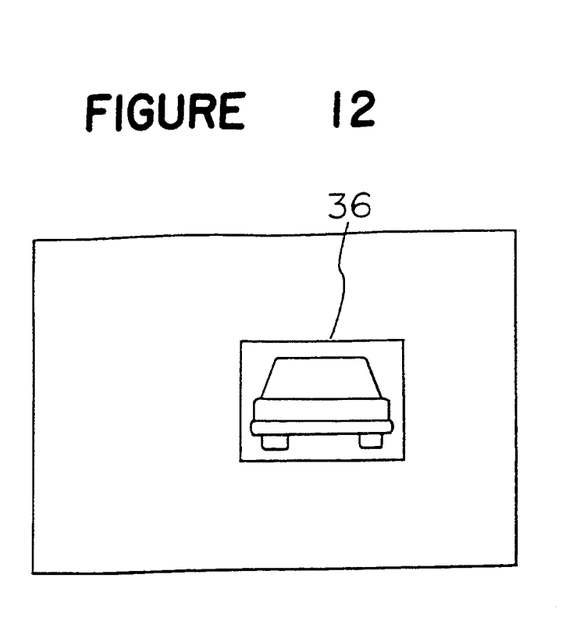
FIG. 12 is a diagram showing a situation wherein a window is set to an image of a new preceding vehicle which shows up by cutting-in or lane change according to the present invention.
Figure 13:
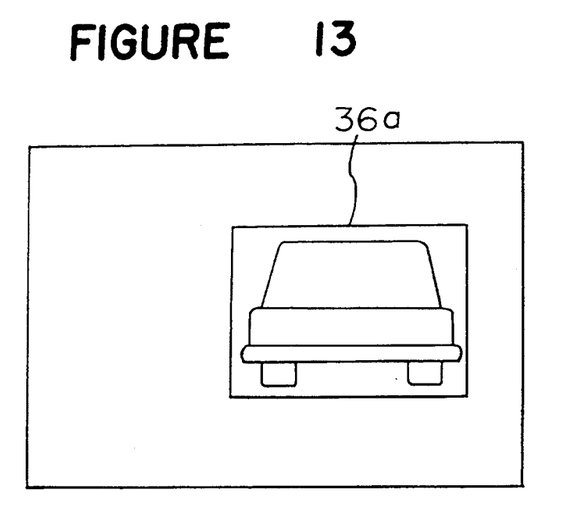
FIG. 13 is a diagram showing a situation wherein a window is set to an image of a new preceding vehicle which shows up by cutting-in or lane change according to the present invention.

Next, a new tracking window 36 is set by the image-tracking unit 12 as shown in FIG. 12, such that the cut-in vehicle detected by the above method is a new tracking target. The setting method of the new window is as follows. The tracking window 36 is set by the image-tracking unit 12 at the position of the cut-in vehicle which is specified on the display image plane 11 by the above method, as shown in FIG. 12. The size of the tracking window 36 is the same with that of the gate 34 which is set in accordance with the measured values of the shadow windows 24 and 25 in FIGS. 10 and 11. That is to say, the size of the image 5a of the preceding vehicle is changed in accordance with the distance from the driving vehicle to the preceding vehicle 5. Therefore, when the measured value of the distance is comparatively small, a large symmetry determining gate 34a is prepared as shown in FIG. 9. A reference numeral 35a designates a symmetry determining domain in this case. Accordingly, the large tracking window 36a is set as shown in FIG. 13.

As stated above, when the tracking window 36 surrounding the image 5a of the preceding vehicle, is set, the image-tracking of the image of the preceding vehicle is restarted by the tracking window 36, and the distance from the driving vehicle to the preceding vehicle of which image is surrounded by the tracking window 36 is continuously measured.

Figure 14:
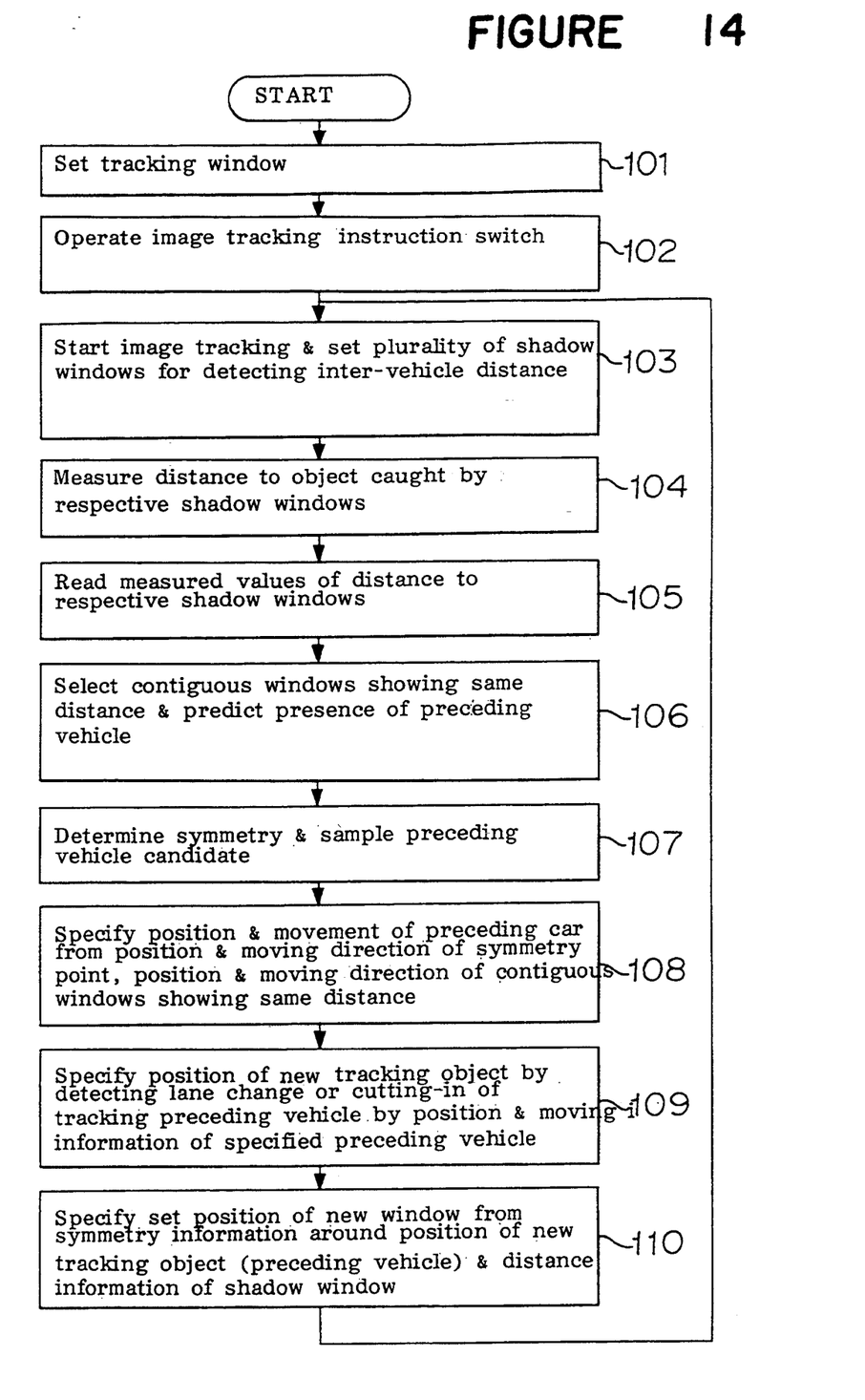
FIG. 14 is a flow chart showing the operation Of the invented device.

FIG. 14 is a flow chart showing the above operational procedure. First, the operation sets the tracking window 14 which is displayed on the display image plane 11, such that the tracking window 14 surrounds the image of the preceding vehicle to be image-tracked in front of the driving vehicle (step 101). The operator operates the image-tracking instruction switch 13 (step 102). The microcomputer 10 inputted with the operational signal starts the image-tracking by the tracking window 14 by controlling the image-tracking unit 12, detects the image-vehicle distance from the driving vehicle to the preceding vehicle which is the target to be tracked and sets the shadow windows 21 through 26 which are not displayed on the display image plane 11 (step 103). The operation measures the distances from the driving vehicle to the objects caught by the respective shadow windows (step 104). The operation reads the measured distance information and the positions of the shadow windows into the memory (step 105), selects the contiguous shadow windows showing the same measured value having comparatively short distances, and predicts the presence of the preceding vehicle in front of the driving vehicle (step 106). The operation prepares the symmetry determining gate having a size thereof in accordance with the measured distances, determines the symmetry in the symmetry determining domain, and samples out candidates of the preceding vehicles (step 107). The operation specifies the positions and the moving situation of the preceding vehicles in front of the driving vehicle, from the position and the moving direction of the point (candidate) having high symmetry, and the position and the moving direction of a contiguous window detecting the same short distance (step 108). The operation detects the lane change of the preceding vehicle or the cutting-in of another vehicle to the driving lane from the above information and the distance information of the shadow windows (step 109). Thereafter, the operation determines the set position of a new tracking window from the former tracking window and the position information of the preceding vehicle, and sets the new tracking window having the size in accordance with the inter-vehicle distance, at the set position. Thereafter, the inter-vehicle distance from the driving vehicle to the preceding vehicle caught by the new tracking window is continuously detected.

The detailed explanation has been given to the embodiment of the present invention as above. Among various means which have been explained in the embodiment, especially with respect to the method which specifies the preceding vehicle by the shadow windows, many kinds of methods may be considered in accordance with the characteristic of the image-tracking unit or the characteristic of the information of the image signal, other than the method which has been described in this embodiment. The method in this embodiment is only one of the methods which are considered to be the means claimed by the present invention.

As stated above, the present invention comprises the image sensors taking the images of the preceding vehicles substantially by the pair of top and bottom optical systems, the display means for displaying the images of the preceding vehicles taken by the image sensors, the image-tracking means for setting the tracking window surrounding the image of the preceding vehicle and for image-tracking the image of the preceding vehicle by the tracking window, and the distance detecting means for calculating the inter-vehicle distance between the driving vehicle and the preceding vehicle by detecting the deviation between the top and bottom corresponding image signals wherein the image signal in the tracking window is the reference signal. Therefore, even when a plurality of preceding vehicles are running, the target preceding vehicle is shown by the tracking window, and the driver is easily informed of the preceding vehicle which the driving vehicle follows and detects the inter-vehicle distance.

Further, the present invention further comprises the means for setting the plurality of shadow windows which are not displayed on the display image plane, other than the tracking window, at the predetermined positions, the means for detecting the distances from the driving vehicle to the objects caught by these shadow windows and the means for determining the horizontal symmetry. Therefore, the present invention can detects the positions of presence and the moving situation (lane change or cutting-in) of the preceding vehicles, along with the distance information of the respective shadow windows and the tracking information of the tracking window which are detected.

Furthermore, the present invention is provided with the means of setting the tracking window surrounding the image of the preceding vehicle at the position of presence of the image of the specified preceding vehicle, which is provided with the predetermined size based on the distance information. Therefore, even when the tracking target is changed, the invention can continuously perform the image-tracking and the detecting the inter-vehicle distance by the new tracking window, as above.

I claim:

1. An inter-vehicle distance detecting device wherein top and bottom image signals focused on top and bottom image sensors substantially by a pair of top and bottom optical systems, are compared and distances from a driving vehicle to preceding vehicles are measured by detecting deviation between the top and bottom images under a principle of trigonometry comprising:

a display means for displaying the images of the preceding vehicles taken by either one of the top and bottom image sensors;

an image-tracking means for setting a tracking window surrounding one of the images of the preceding vehicles and image-tracking said one of the images of the preceding vehicles by the tracking window;

a first distance detecting means for calculating the distance from the driving vehicle to the one of the preceding vehicles by detecting the deviation between the corresponding top and bottom images wherein an image signal of the one of the preceding vehicles is a reference signal;

a shadow window setting means for setting a plurality of shadow windows which are not displayed on a display image plane and which are totally different from the tracking window, at predetermined positions in the image taken by one of the top and bottom image sensors;

a second distance detecting means for detecting distances from the driving vehicle to objects caught by the respective shadow windows by detecting the deviation between top and bottom corresponding image signals wherein image signals in the shadow windows are reference signals;

a symmetry determining means for reading image signals in an arbitrary domain in the shadow windows and surroundings thereof and determining horizontal symmetry in the arbitrary domain;

a detecting means for detecting a cut-in vehicle or lane change of the one of the preceding vehicles which is image-tracked by predicting movements of the preceding vehicles in front of the driving vehicle based on a distance information on the distances from the driving vehicle to the objects in the shadow windows caught by the second distance detecting means, an output of the symmetry determining means and an information provided by a calculation result of the image-tracking means on the one of the preceding vehicles which is image-tracked by the tracking window.

2. The inter-vehicle distance detecting means according to claim 1, further comprising:

a means for determining a position of a second one of the preceding vehicles which is a new object for image-tracking based on a symmetry information on the horizontal symmetry provided by the symmetry determining means and the distance information provided by the second distance detecting means on the shadow windows in the neighborhood of candidate points of presence of the preceding vehicles, when the lane change of the one of the preceding vehicles which is being image-tracked or the cut-in vehicle is detected by predicting the movements of the preceding vehicles in front of the driving vehicle; and a means for automatically setting a second tracking window in place of the tracking window having a size in correspondence with a distance from the driving vehicle to the second one of the preceding vehicles such that the second tracking window surrounds an image of the second one of the preceding vehicles.

* * * * *